United States Patent Office 3,505,080
Patented Apr. 7, 1970

3,505,080
METHOD AND MEANS FOR SEASONING AND CURING FOOD PRODUCTS
Lawrence J. Cullen, 1517 Bonnie Brae, River Forest, Ill. 60305
No Drawing. Continuation-in-part of application Ser. No. 428,543, Jan. 27, 1965. This application Aug. 18, 1967, Ser. No. 661,557
Int. Cl. A23b 1/01; A23l 1/26
U.S. Cl. 99—108                                    4 Claims

ABSTRACT OF THE DISCLOSURE

Seasoning mixtures of liquid spice extractives are adsorbed on solid nonporous pyrogenic silica particles having no internal surface area and which serve as a carrier adapted for homogeneous distribution by mechanical means throughout the mass of a food product made of comminuted materials and from which the adsorbed extractives are stripped by the action of moisture within the food product to become uniformly dispersed therein as pure spice extractive, independent of the carrier, for seasoning the food product. Curing agents applied to the same carrier are dispersed in the food product in the same manner for effecting a curing operation.

CROSS REFERENCE TO RELATED APPLICATION

This application is a continuation-in-part of my copending application Ser. No. 428,543, filed Jan. 27, 1965, and now abandoned.

BACKGROUND OF THE INVENTION

Field of the invention

This invention relates to an improved means and method for incorporating seasoning materials into the mass of food products made from emulsified or comminuted materials wherein the seasoning means is in the form of liquid extractives of natural spices dispersed on a finely divided insoluble carrier and introduced into the food product by mechanical distribution of the carrier throughout the food product.

This invention also concerns an improved method and means for the dispersion of a curing compound in a processed meat product, wherein the curing compound is coated on solid nonporous pyrogenic silicea particles for mechanical distribution throughout the meat product to assure homogeneous distribution of the curing ingredients and maximum surface contact of the product by the curing medium.

Description of the prior art

Extractives of natural spice are essential oils and oleoresins, obtained from natural spices by distillation and solvent extraction. The advantages of spice extractives are well known in the processing of seasoned products and to the spice industry. They are generally regarded as the most effective method of seasoning quantities of processed food products. One of the chief advantages of spice extractives is the control that can be exercised over the final extractive so that each batch exactly matches a control. Batches of natural spices will vary in seasoning components due to weather, growing conditions, soil, storage, etc. In manufacturing extractives, the seasoning components can be adjusted in the final extractive to compensate for natural spice deficiency, thereby providing extractives of unvarying flavor and potency at all times regardless of the varying quality of natural spice. Extractives are therefore the most desirable seasoning for most food products since an unvarying flavor in the finished product is essential to continued consumer acceptance.

Since extractives are the essential seasoning components of the natural spice, the finished form is but a small percentage of the original natural spice. This ratio of extractive to natural spice will vary:

1 pound of oleoresin of mace equals 10# natural mace
1 pound of oleoresin of black pepper equals 20# natural black pepper
1 pound of oil of coriander equals 200# natural coriander
1 pound of oil of garlic equals up to 1000# natural garlic While the spice extractive is recognized as the most desirable form of a seasoning, the small amount of pure liquid spice extractive required to season a given amount of a food product presents a problem relative to complete uniform distribution of the spice extractive in the product. In a specific seasoning formulation, for example, Pickle and Pimento Loaf, while 185.13 grams of natural spice are used to season each 100 lbs. of product, only 8.59 grams of spice extractive are required.

In attempting to achieve complete uniform distribution, spice extractives have been dispersed on soluble carriers (salt, dextrose, sugar, etc.) and insoluble carrier (calcium silicate, tricalcium phosphate, calcium carbonate, magnesium carbonate, magnesium silicate, sodium silicoaluminate, sodium calcium silicoaluminate, silica, alumina, etc.).

With soluble carrier, the dispersed spice extractive is released when the carrier is dissolved by the moisture in the end product. This will occur almost immediately which can cause a concentration of spice extractives, detrimental to the overall flavoring desired in the end product. The release of the spice extractives most often occurs prior to the complete distribution of the carrier/spice extractive throughout the end product.

Soluble carriers are also limited in the amount of spice extractive that can be dispersed thereon. In most instances, the spice extractives are about 3–4% of the total soluble seasoning additive and the carrier is the remaining 96–97%. At concentrations above 4%, the soluble seasoning becomes too "wet" to handle efficiently.

Soluble seasonings range in recommended useage from 8 ounces to 16 ounces per 100 lbs. of end product. In the case of a soluble seasoning with a usage of 8 ozs. per 100 lbs. of end product, only 0.24 to 0.32 ounce is spice extractive. It can therefore be seen that the limited ability of the soluble carrier to hold spice extractive requires soluble seasonings to be very weighty relative to the amount of effective seasoning potential. This problem of weight and bulk is reflected in all facets of the manufacturing, distribution and eventual useage of soluble seasonings.

With the insoluble carriers heretofore used the spice extractives are absorbed in and adsorbed on the insoluble carrier particles. They are distributed throughout the end product by mechanical mixing or processing. While insoluble carrier/spice extractive mixes in powder form overcame the total weight/seasoning power deficiency of soluble seasonings, the reliance on mechanical mixing or processing to distribute the insoluble seasoning particles through the mass of end products can be a problem. The particles in which spice extractive has been absorbed are in powder form. The amount required per given weight of end product is small, in the range of 300–400 parts per million. It is very difficult under plant processing conditions to secure homogenous dispersion of the powder by physical distribution or mechanical mixing, portions of product batches can be overseasoned and portions under-seasoned.

Cures are used in the majority of comminuted and smoked meat products for: (1) color development of the lean meat, (2) flavor development, (3) preservation.

The curing ingredients generally used are sodium nitrite and sodium nitrate, also to a lesser degree, potassium nitrite and potassium nitrate. These are used individually in some curing compounds and in combination in others, with the combination of sodium nitrite and sodium nitrate being the compound which is most universally used by meat processors. In current curing compounds, the nitrite and/or nitrate are blended with salt and/or sugar for dispersion purposes. Salt is added in substantial quantities at the plant level as the preservative.

The nitrite and/or nitrate is responsible for the color and flavor development in the cured products.

The most generally accepted curing compounds are combinations of nitrite and nitrate mixed with salt and/or sugar as the dispersion carrier. The nitrite/nitrate combination is a blend of a fast source of nitric oxide (nitrite) and a slower source (nitrate), which is converted to nitrite and then to nitric oxide. Nitrites are not stable and are decomposed to nitric oxide by the action of natural substances in the meat.

Both nitrites and nitrates can be poisonous in large quantities. The Bureau of Animal Industries of the U.S. Department of Agriculture limits the amounts of these ingredients that can be used in plants under Federal inspection. Most states also limit the amounts that can be used. In the case of comminuted meat products, under M.I.D. (Meat Inspection Division) regulations, not over ¼ ounce of nitrite and not over 2¾ ounces of nitrate can be added for each 100 lbs. of meat. Also under M.I.D. regulations, the use of nitrites and nitrates must not result in a finished product containing more than 200 parts per million of nitrite.

To assure compliance with 200 p.p.m. M.I.D. regulation, most processors limit the usage to a maximum of 0.24 oz. of nitrite and 0.24 ounce of nitrate for each 100 lbs. of product.

A typical curing compound for use in comminuted meat products is:

| | Percent |
|---|---|
| Sodium nitrite | 3.00 |
| Sodium nitrate | 2.00 |
| Salt | 95.00 |

The recommended useage of this compound is 8 ozs./100 lbs. product. In 8 ounces of this compound there is:

| | Ounces |
|---|---|
| Sodium nitrite | 0.24 |
| Sodium nitrate | 0.16 |
| Salt | 7.60 |

SUMMARY OF THE INVENTION

The inventive concept involved in this disclosure is to provide an improved seasoning material wherein liquid spice extractives are adsorbed on solid nonporous pyrogenic silica particles of a size less than 0.01 micron and having no internal surface area to produce a seasoning or curing additive, in powder or paste form, which upon being mechanicaly distributed throughout a processed food product, during the processing thereof, will release the seasoning agent as a free liquid composition of spice extractives wholly independent of the carrier. The release of the essential oils or spice extractives is brought about by the substitution of moisture, contained in the food product, for the oils on the surface of the silica particles because of the greater affinity of the silica for moisture and the pressures generated during the processing operations.

The release of the essential oils from the carrier particles allows the seasoning to permeate the food product so that fully uniform distribution is achieved rapidly with a minimal amount of the spice extractives and carrier material being required. This enables the use of pure spice extractives as the seasoning medium for processed food products free of the problems inherent with both soluble and insoluble carriers.

A particular advantage of this invention for seasoning purposes is the material reduction in seasoning cost per hundred pounds of finished food product. The spice extractive content of my improved seasoning compound can be about 10% less than that required for the same spice formulation on a soluble carrier because, with the use of the improved material, the flavoring intensity is greatly increased due to the fact that pure spice extractives in free form are performing the seasoning function. Also, in many cases, and for the same reason, spices normally used in very minute quantities can be reduced in quantity in in the seasoning formulation. For example, oil of cassia, oil of dill, oleoresin of oregano, and oil of basil may be reduced by 20 to 30% of that heretofore used; and oleoresins of African capsicum, oleoresin of mace and liquid smoke can be reduced by approximately 15%.

This invention also concerns the curing of food products and in that respect employs the same nonporous pyrogenic silica carrier for the curing agent, usually a composition of sodium nitrite and sodium nitrate, whereby a complete dispersion of the curing agent throughout the product is obtained and the time required for the cure to develop is materially reduced. A major problem in the use of curing compounds is the difficulty in getting a homogeneous dispersion of the nitrite and nitrate through the mass of the food product since nitrite is at a level of 150 parts per million and nitrate is at 100 parts per million. If homogenous dispersion is not obtained there will be under-curing and over-curing of the product which will render it unfit for consumption. By the use of the pyrogenic silica carrier a homogeneous dispersion of the curing material is readily obtained because of the unique characteristics of the particles with respect to size, vast surface area per unit of weight involved, and the hydrophilic nature of the particles and their reaction under pressure or stress.

DESCRIPTION OF THE PREFERRED EMBODIMENTS AND METHOD

The preferred form of pyrogenic silica particles to be used for this invention have the following physical characteristics:

Particle size—Less than 0.01 micron
External surface area—In excess of 300 square meters/gram
Internal surface area—None
Silica content ($SiO_2$)—Over 99.0%
pH—Not over 4.29%
Number of particles/gram—In excess of $4.4 \times 10^{17}$ A material particularly suitable for this invention and having the above characteristics is the pyrogenic or dry process silica produced by the hydrolysis of silicon tetrachloride at 1100° C. and sold by Cabot Corporation under the trademark of Cab-O-Sil. The Cab-O-Sil grade EH–5 has been very successful in the practice of my invention and its physical properties are as follows:

Particle size—0.007 micron
Surface area—390±40 sq. meters/gram
Density—2.3 pounds/cu. ft.
pH (4% aqueous dispersion)—3.5–4.2
Silica content—99.8%

The pyrogenic silica used in this invention is made up of individual particles which are grouped together in loose chain-like formations. These groupings are due to the hydrogen-bonding nature of the particles. The chain-like formations are easily separated into particles by agitation or stress.

PROCESSING SEASONING COMPOUND

In the manufacture of a dry seasoning compound, the spice extractives are measured and premixed to a homogenous blend. This is current state of art.

The pyrogenic silica is premixed or "prefluffed" in a high speed blender with the agitator blades set at such an angle so that the entire mass of silica particles is subject to agitation or sheer forces. This premixing or "prefluffing" step separates the chain-like formations into a swirling mass of separate particles. A period of 2 minutes at high speed will properly condition the silica particles.

The premixed spice extractives are poured into the swirling mass of silica particles with the flow regulated so that the mix is homogenous.

The time necessary to convert a given amount of spice extractives and the calculated amount of pyrogenic silica to a homogeneous mixture will depend on the density of the spice extractives. Dense spice extractives require a longer blending time. For most densities of spice extractives, the blending time is less than 5 minutes.

In this process, a relatively small volume of spice extractives is thoroughly blended into a vast number of pyrogenic silica particles having an enormous external surface area. The spice extractive is adsorbed as a thin coating on the surface of the particles. The great difference between the amount of spice extractive to be adsorbed on the total external surface area and the surface area available to adsorb coating, results in three different types of particles in the final mixture:

(a) Particles with a complete coating of spice extractive
(b) Particles that are semi-coated with spice extractive
(c) Particles that have no coating of spice extractive The final mixture is a homogeneous blend of all three types of particles.

It can be readily seen, from the following example, why the three types of particles exist in the final mix. In 0.40 ounce of the mix, used to season 100 lbs. of pickle and pimento loaf, 0.526 cubic inch of spice extractive is being dispersed over 1172.5 square meters of surface area of 2.75 grams of pyrogenic silica particles. The compound is a dry powder of low bulk density, approximately 8–12 pounds per cubic foot.

When the mixing is completed, the particles regroup into loose chain-like formations consisting of particles of all three types. Upon regrouping, there is no transfer of spice extractives between particles, nor separation of particles, the homogenous nature of the mixture remains stable.

The pyrogenic silica, as previously stated, is being used as a temporary carrier to secure widespread dispersion of the spice extractives through the end product. Some of the particles in the compound are carrying minute surface coatings or partial coatings of spice extractive through the product and then releasing it as pure spice extractive to perform the seasoning function.

The dispersion of particles and subsequent release of spice extractive is the result of the unique features of pyrogenic silica particles, the method by which particles and spice extractives are combined, composition of the end product and the processing steps through which the end product passes after the introduction of the compound.

The important factors which affect the action of the compound in the end product are:

(1) Pyrogenic silica particles are hydrophilic, having a greater affinity for water than for spice extractives.

(2) The ratio of the seasoning conpound to the volume of end product is very low, in the area of 250 parts per million.

(3) Pyrogenic silica particles, when subjected to pressure and/or stress, release the surface coating. (This is easily demonstrated by mixing pyrogenic silica particles and water to a dry powder. By very light pressure of the finger on the dry powder, the surface coating of water is visibly released.)

The product that is the subject of this invention is most easily used in products that have a moisture content in excess of 10% during the initial phase of processing. Moisture is the catalyst that starts the sequence; breaking chains into particles and short chains, stripping the spice extractive coating from semi-coated particles and in combination with processing pressures and/or stresses, stripping the spice extractive coating from the fully coated particles.

This product can be used in end products having a moisture content of less than 10% by premixing the compound with a small amount of water prior to adding to the end product. The premixing starts the dispersion process which then will be completed by the moisture in the end product.

The sequence that takes place when the seasoning compound is put into the end product is as follows:

(a) The compound is added, in the case of comminuted meat products, while the meats and other ingredients are being reduced to a smooth emulsion. This is during the chopping cycle after the ground meats have been reduced by the chopper to the point where cell rupturing has occurred.

(b) When the compound is added, it is spread over the entire emulsion as the chopping bowl revolves. The first action is that of moisture in the emulsion on the chain-like formations of the compound. The chain-like formations are broken apart by the moisture coating of the particles in the formations that are not coated or semi-coated with spice extractive.

(c) The concentration of the pyrogenic silica/spice extractive compound in the total product mass is small. In the case of the Pickle and Pimento Loaf Seasoning previously described, it is 0.40 ounce to 100 lbs. of product, 250 parts of seasoning compound per million parts of end product.

Due to the low concentration and the mechanical action of the chopper, the coated and semi-coated particles thus are unleased by the initial breakup of the chain-like formations, are not able to regroup into chain formations.

(d) The nonporous silica particles have an affinity for moisture. The moisture in the end product "attacks" the semi-coated particles and is able to strip off the partial coating of spice extractive.

(e) The end product is being subjected to a high degree of agitation during the chopping cycle. The agitation of the product mass and the pressures and/or stresses on the product as it is constantly directed through the series of chopper blades are the forces which cause the separation of the spice extractive coating from the surface of the particles that were fully coated. The moisture that is present is also working on these particles as pressure and stress forces the particles to release the surface coating of spice extractive.

(f) Subsequent processing operations insure a complete stripping of the spice extractive surface coating by additional pressure and/or stress in conjunction with the moisture. After the chopping cycle, the product is processed through a homogenizer which forces the emulsion through a series of cutters under intense pressure.

The product is finally stuffed into cooking devices under approximately 150 pounds of pressure. When the product is ready for cooking, the spice extractive has been homogeneously dispersed through the mass of product in its purest form.

An example of the use of this invention in the dry seasoning form is the following formula for a pickle and pimento loaf seasoning. It is used, in this form, at the rate of 0.4 ounce for each 100 pounds of product. In 0.4 ounce of this seasoning compound, the weight of the spice extractives is 0.303 ounce, the weight of the pyrogenic silica particles is 0.097 ounce.

|  | Percent |
| --- | --- |
| Oleoresin of black pepper | 38.25 |
| Oleoresin of red pepper | 19.13 |
| Oil of marjoram | 2.75 |
| Oil of coriander | 0.90 |
| Oleoresin of ginger | 1.20 |
| Oil of thyme | 1.20 |
| Oil of allspice | 9.57 |
| Oil of sage | 2.75 |
| Pyrogenic silica particles (EH-5) | 24.25 |

In this formulation, used at the rate of 0.4 ounce per 100 lbs. of product, the pyrogenic silica material weighs 2.75 grams and is made up of $5.5 \times 10^{19}$ particles.

The principle of using pyrogenic silica particles as a temporary carrier for spice extractives can be incorporated into a paste product that performs the same functions as the dry product.

The paste version of this invention provides a product that can be packaged in various sizes of collapsible tubes sized to fit the requirements of one batch of end product. The batch-sized collapsible tubes would be especially effective where small batches of end product (under 500 pounds) are being processed, where the useage of the seasoning compound would be under two ounces per batch.

The collapsible tube has a minute opening under the outer cap which enables the operator to squeeze out the paste in a very fine stream for the purpose of thorough initial dispersion of the paste into the end product.

Using the paste product, the spice extractives are homogeneously dispersed through the end product by the unique features of the pyrogenic silica particles previously described and the method by which the particles and the spice extractives are processed into the compound. The products in which the paste version of the product could be used are identical with those described for the dry compound.

A paste for seasoning a comminuted meat product is as follows:

|  | Percent |
|---|---|
| Oleoresin of black pepper | 27.93 |
| Oleoresin of red pepper | 13.97 |
| Oil of marjoram | 2.01 |
| Oil of coriander | 0.66 |
| Oleoresin of ginger | 0.89 |
| Oil of allspice | 7.14 |
| Oil of thyme | 0.89 |
| Oil of sage | 2.01 |
| Ethyl alcohol | 10.97 |
| Pyrogenic silica particles EH–5 | 16.77 |
| Monosodium phosphate | 8.38 |
| Sodium bicarbonate | 8.38 |

This paste is used at the rate of 15.5 grams per 100 pounds of end product.

In this paste product, the effervescent ingredients (monosodium phosphate and sodium bicarbonate) are added to increase the speed of the breakup of the paste. Many combinations of effervescent ingredients compatible with the spice extractives and other ingredients and activated by moisture could be used.

The effervescent ingredients are "triggered" by moisture in the end product. As soon as the fine stream of paste is put onto the emulsion, it is immediately changed into a broader, thicker layer of foam by the action of the effervescent "triggered" by the moisture. In the foam, the chain-like formations of seasoning compound are freed to be acted upon by the moisture in the product and processing pressures so that the chain-like formations are broken into particles and the spice extractive "stripped" from the particles by the moisture and the pressures/stresses exerted by the processing cycle. When the chain-like formatioins are freed by the foaming, the subsequent action is the same as with the dry compound.

To achieve the chain breakup and the spice extractive stripping, it is necessary that the seasoning compound, whether in dry or paste form, be composed of the three different types of particles; fully-coated, semi-coated and uncoated particles. Normally to produce a paste, the percent of pyrogenic silica required is considerably less than the amount required to produce a dry form. When mixing particles into the spice extractive, the extractive increases in viscosity and continues to increase as additional silica is added, finally forming a paste. As further particles are added beyond the paste stage, the moisture will turn to a dry powder. As a viscous liquid and as a normal paste, the ratio of spice extractive to pyrogenic silica is sufficiently high so that there is "saturation" of the silica, i.e., all particles are fully coated and there is excess free extractive.

To include sufficient pyrogenic silica particles so as to produce the three types of particles in the paste form, the capacity of the spice extractive to hold a higher percent of particles must be increased. This is done by adding a highly polar, hydrogen-bonding liquid or liquids to the spice extractive before it is incorporated into the pyrogenic silica particles. In the example shown, this formulation would normally be a paste at a concentration of 10% silica particles (90% spice extractive) and a dry mix in the range of 20–25% particles (75–80% spice extractive). With the addition of the ethyl alcohol, it remains in paste form even though the silica particles ratio to spice extractive is 23.2% to 76.8%.

By the addition of ethyl alcohol to the spice extractives, the concentration of silica particles, relative to the spice extractive, can be increased far beyond the normal percentage and have the compound remain in paste form. The necessary high degree of silica particles is present so that the spice extractive can be dispersed in a manner to produce the three types of particles required for the unique dispersion of the compound particles and the spice extractive "stripping" of this invention while the product is in a useable paste form.

An example of a highly compatible type of end product for this invention, but not limited to this type product, is comminuted meat products: wieners, frankfurts, bologna, meat loaves, salami, pork sausage, sausage of all types, etc. In the type product, various meats and other ingredients are mechanically reduced to an emulsion and then reconstituted into a new form. The seasoning compound is added during the emulsifying stage.

It can also readily be seen that the product of this invention will be very effective for the dispersion of pure spice extractives in catsup, sauces, gravies, salad dressings, soups, stews, puree products of all types, corned beef hash and like products, cheeses, and similar products.

As a pyrogenic silica curing compound, an object of this invention is a product that puts the nitrite and nitrate in such a form so that complete homogenous dispersion is possible through the end product and stabilizes the ratio between nitrite and nitrate in the curing compound.

In this invention, the nonporous silica particles are used as the carrier for the curing ingredients; nitrite, nitrate, and combinations of both ingredients.

A typical curing compound utilizing this development is:

|  | Percent |
|---|---|
| Sodium nitrite | 30.00 |
| Sodium nitrate | 20.00 |
| Pyrogenic silica EH–5 | 20.00 |
| Water (275° F.) | 30.00 |

The nitrite and nitrate are completely dissolved in the boiling water.

The nitrite/nitrate/water solution is blended with the silica particles in the same manner as previously described for using the particles with spice extractives.

The nitrite/nitrate/water/silica mixture is heated at 250° F. to completely remove the moisture.

After removing the water, the mixture is a very light mass of particles some of which are completely coated, some semi-coated with a thick sheath of nitrite/nitrate and some particles are uncoated.

The mass of particles to be surface coated with the nitrite/nitrate solution is far in excess of the spreadability of the solution.

In the very fine curing compound, the composition is:

|  | Percent |
|---|---|
| Sodium nitrite | 42.86 |
| Sodium nitrate | 28.57 |
| Pyrogenic silica | 28.57 |

This compound is used at the rate of 0.56 ounce to each 100 lbs. of end product.

In the final curing compound, the three types of particles reform into loose chain-like formations. When the compound is put into the product to be cured, the product moisture starts the separation of the chains into particles. The coated and semi-coated particles are widely dispersed through the entire mass of product. The curing ingredients are in the form of surface coatings on a portion of the silica particles. The rapid dispersion of the coated and semi-coated particles and the exposure of the curing ingredients via the surface area coatings insures a homogenous dispersion of the cure through the end product. It also reduces the time required for the cure to develop since the vast expanse of surface area covered with the curing agents exposes the bulk of the nitrite to the natural substances in the meat that converts them to nitric oxide. The reduction of nitrate to nitrite is also speeded up as a result of the widespread exposure to the oxidation factors in the meat.

With this process and products, there is no possibility of unequal distribution of nitrite/nitrate as can occur when these two are mixed on a salt or salt/sugar carrier by mechanical means. The curing compound and its dispersion in the end product are both prefectly homogeneous.

An additional problem in current curing compounds is the maintenance of the prescribed ratio of nitrite and nitrate in the compound. Nitrate slowly oxidizes to nitrite as a normal process. This oxidation is greatly speeded up in the presence of moisture. There are many ways in which a curing compound can pickup undesirable moisture that will change the nitrite/nitrate balance. The change in the balance will effect the processing time and the rate of flavor/color development. With this current invention, the coated and semi-coated particles are in union at all times with uncoated particles of pyrogenic silica. They are in formations from the time of manufacture until the curing compound is put into the end product. Any moisture that enters the curing material will be absorbed by these uncoated silica particles due to the great affinity for moisture. The nitrite-nitrate ratio will always be the one established at the time of manufacture.

This principle of the dispersion of the curing ingredients can be used with nitrite, nitrate, and any combinations thereof. It can be used with cures mixed with salt, sugar or any flavoring agents. It can be used when cures are mixed with certain chemicals which speed up color development and help prevent fading of the cured meat color after the cure has been completed and when the product is on retail display. Some of these chemicals are: ascorbic acid, isoascorbic acid, sodium ascorbate, sodium isoascorbate and the like.

The advantages of the seasoning compound made with pyrogenic silica particles:

(1) It enables the use of pure spice extractives as seasonings.

(2) Greater uniformity in end product taste due to the outstanding dispersion of spice extractives.

(3) Cost reductions for seasoning manufacturer:

(a) Reduction in manufacturing time by 90% as compared with soluble seasonings.
(b) Lower labor cost/dollar of sales.
(c) Lower freight, storage and handling charges (4) Better shelf life than soluble, insoluble, or natural seasoning or spice. The particles carrying the spice extractive coating are within a mass of uncoated particles that provide a barrier against volatile components in the spice extractives escaping and also prevents entrance of contaminates to the spice extractive coatings.

(5) The reduction in carrier weight and bulk enables new types of packaging to be used, previously not feasible due to weight/bulk ratio to product value.

Examples:
Collapsible plastic tube for paste compounds
Foil lined, spiral wound cans with shaker tops for dry seasonings and curing compounds.

The advantages of curing compounds made with pyrogenic particles:

(1) Stabilized blend of nitrite and nitrate.

(2) Complete, rapid dispersion of the cure through the product.

(3) Nitrite/nitrate coating stripped from particles by action of the moisture in the product.

(4) Fast curing action due to the wide dispersion of coated particles and the vast surface area that is exposing the curing agents to the product.

(5) Cost reductions to cure manufacturer are approximately the same as with spice extractive.

(6) Nitrate in compound is protected from accidental speed up of the oxidation process.

As used in the following claims, the term "treatment medium" is intended to mean a seasoning material such as a spice extractive or a combination of spice extractives, or a meat curing material such as sodium nitrite, sodium nitrate, or a combination of sodium nitrite and sodium nitrate.

I claim:

1. A composition for treatment of a processed food product comprising a member selected from the group consisting of a liquid spice extractive and liquid meat curing salts carried on the surface of a carrier of non-porous particles of pyrogenic silicon dioxide having a particle diameter not greater than 0.01 micron.

2. A composition according to claim 1 wherein the said liquid spice extractive is a compound of seasoning oils and is physically combined with a quantity of the silicon dioxide particles sufficient to form a paste.

3. A composition according to claim 1 wherein the said liquid spice extractive is a compound of sodium nitrite and sodium nitrate coated onto the surface of the silicon dioxide particles.

4. The process of treating a mass of comminuted meat product containing moisture in free form which comprises adding a predetermined amount of the composition according to claim 1 wherein said member is meat curing salts, to the meat product approximately midway of the process of reducing the meat product to paste form in a mechanical chopper, and then completing the chopping cycle while the free moisture in the meat product substitutes itself for the meat curing salts on the surface of the silicon dioxide particles and releases the said salts to permeate the meat product free of the carrier particles.

References Cited

UNITED STATES PATENTS

| | | | |
|---|---|---|---|
| 2,054,625 | 9/1936 | Griffith | 99—222 |
| 2,847,312 | 8/1958 | Harper et al. | 99—108 XR |
| 2,925,344 | 2/1960 | Peat | 99—140 |
| 3,290,158 | 12/1966 | Treat | 99—143 |

MAURICE W. GREENSTEIN, Primary Examiner

U.S. Cl. X.R.

99—140, 143